United States Patent

Harnoncourt

[15] 3,639,830
[45] Feb. 1, 1972

[54] ATTACHMENT FOR THE MICROANALYSIS OF BLOOD GASES

[72] Inventor: Karl Harnoncourt, Graz, Austria
[73] Assignee: Hans List, Graz, Austria
[22] Filed: Apr. 23, 1969
[21] Appl. No.: 818,560

[30] Foreign Application Priority Data

Apr. 30, 1968   Austria ............................. A 4209/68

[52] U.S. Cl. ............................. 324/30 R, 23/253, 23/230 B, 204/1 T
[51] Int. Cl. ..................................................... G01n 27/42
[58] Field of Search ....................... 324/30, 29; 204/1.1, 195; 23/230 B, 253

[56] References Cited

UNITED STATES PATENTS

| | | | |
|---|---|---|---|
| 3,282,651 | 11/1966 | Ferrari | 23/253 |
| 3,327,204 | 6/1967 | Hillier | 324/30 |
| 3,398,079 | 8/1968 | Arthur | 324/30 X |

*Primary Examiner*—Michael J. Lynch
*Attorney*—Watson, Cole, Grindle & Watson

[57] ABSTRACT

An attachment for the cleaning and drying of measuring capillary tubes for the microanalysis of blood gases having a measuring vessel containing the capillary tube to receive a blood test sample and a measuring electrode arrangement in contact with the test sample and having a scavenging duct connectable to one end of the tube.

4 Claims, 2 Drawing Figures

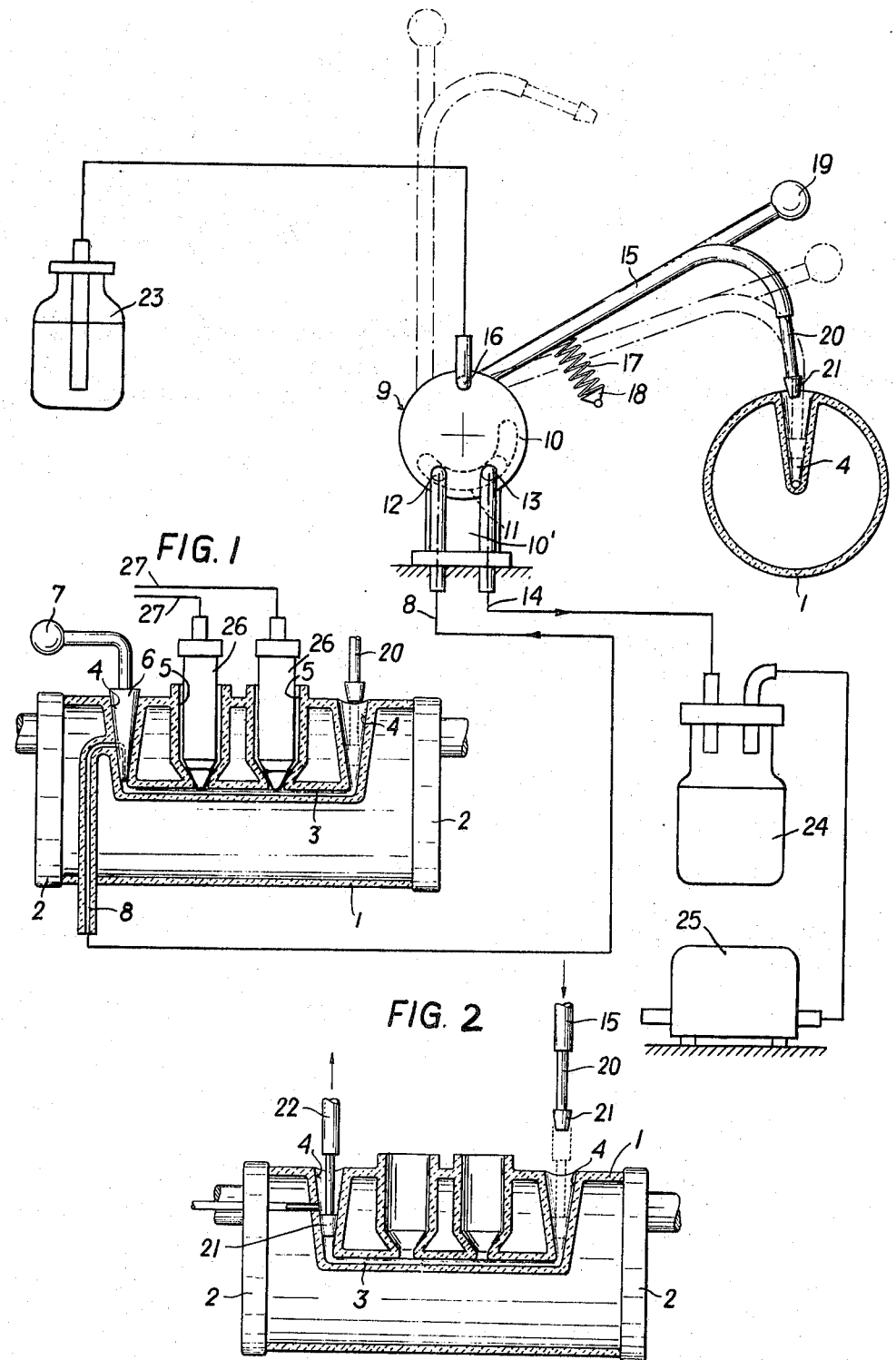

ATTACHMENT FOR THE MICROANALYSIS OF BLOOD GASES

The invention relates to an attachment for the cleaning and drying of measuring capillary tubes of a measuring device for the microanalysis of blood gases, comprising at least one measuring vessel containing the measuring capillary tube receiving the blood test sample and a measuring electrode arrangement in contact with the blood test sample and a scavenging duct connectable to one end of the measuring capillary tube and supplied with a cleansing liquid, such as distilled water, from a container, and a suction pump connectable to the other end of the measuring capillary tube.

Microanalysis of the blood gases includes the determination of various values of importance for the diagnosis of ailments of the heart, lungs, or of metabolic diseases, such as the pH value and the partial oxygen and/or carbon dioxide pressures of a blood test sample. The advantage offered by the microanalysis of blood gases as compared with former methods of examination resides in the fact that a few drops of blood only are required to carry out all sorts of measurements. However, these advantages are partly offset by the fact that owing to the small blood volume the instruments required for the various measurements have to be equipped with measuring capillary tubes which are extremely difficult to cleanse. This cleansing procedure comprises the scavenging of the measuring capillary tubes, for example with distilled water and subsequent drying. The measuring capillary tubes have to be cleansed not only prior to every measurement, but also before and after each calibration of the measuring electrodes which becomes necessary at certain intervals of time as well as in connection with various intermediate operations.

A conventional measuring instrument for the microanalysis of blood gases comprises preferably cup-shaped measuring vessels closed on all sides and thermostatized at about 37° C. by a liquid charge. Into measuring vessel preferably U-shaped measuring capillary tubes are sealed whose upright arms terminate in flared-out receiving apertures which are open in the direction of the upper side of the measuring vessel. The electrode arrangement is connected to the horizontal portion of the measuring capillary tube. In one arm of the measuring capillary tube terminates, on one side, the gas feed pipe which serves to carry a calibration gas or an equilibration gas, depending on the nature of the measuring operation, to the capillary tube. Into the opposite receiving bore of the measuring capillary tube a pipe elbow can be inserted, the free end of which serves as a hose liner. This is the place for connecting various attachments of the instrument depending on the operations to be performed. For the cleaning of the measuring capillary tube provision should be made for a hose line connecting the hose liner to a suction pump. At the same time, distilled water has to be introduced in any suitable manner (for example, from a wash-bottle) into the opposite receiving aperture of the measuring capillary tube. The suction action of the pump thus produces a vacuum in the measuring capillary tube, as a result of which the blood test sample is drawn off and distilled water is forced through the measuring capillary tube. For the drying of the measuring capillary tube the receiving aperture opposite the suction stub is cleared and air is drawn through the capillary tube. For the next operation the suction pump should again be disconnected.

With this conventional apparatus, the cleaning and drying of the measuring capillary tube is not only complicated and tiresome, but generally also incomplete, since it frequently happens that a drop of water penetrates into the aperture of the gas feed pipe, as a result of which the subsequent electrode calibration or a subsequent equilibrating operation is disturbed and will cause measuring faults if not detected in due course. These shortcomings of conventional devices are responsible for uncontrollable falsifications of the results of the measurements. Moreover, proper operation of the device requires thorough training and considerable experience on the part of the operator if such errors are to be avoided.

It is the object of the present invention to improve upon and simplify the cleaning and drying process in connection with a measuring instrument for the analysis of blood gases with a view to speeding up operations and producing test readings of greater precision. According to the invention, the attachment required for this purpose features a switchover device connected to the suction pump and comprising at least one scavenging pipe mounted on the mobile switch member and communicating with the scavenging duct, the open end of the connecting pipe being tightly connected to one end of the measuring capillary tube in one final switch position (scavenging position) of the switchover device where the other end of the measuring capillary tube communicates with the suction pump via the switch member, whereas in an intermediate position (drying position) of the switchover device the scavenging pipe is separated from the measuring capillary tube and in the second final switch position (position of rest), communication between the measuring capillary tube and the suction pump is interrupted.

Thus the entire cleansing and drying process is completely automatic and the positive cleansing and complete drying of the measuring capillary tube at any stage of operations merely requires a flick of the switchover device. Consequently, the operator is allowed to proceed forthwith with the next measuring operation.

Since visual control of the state of cleanliness of the measuring capillary tube is not required and all operations are greatly simplified as hereabove explained the instrument can be entrusted to the care of any unskilled operator.

Basically, there are two different possibilities of connecting the measuring capillary tube via the switchover device to the suction pump, the simplest method consisting in providing at the appropriate end of the measuring capillary tube a switch cock establishing communication with calibration gas connections or with an intermediate line leading to a switchover device, as required.

On the other hand, a preferred method of connecting the suction pump to the measuring capillary tube according to the invention consists in the provision of a mobile suction pipe connected to the switch member, the free end of the said suction pipe being tightly connected, both in the scavenging position and in the drying position of the switchover device, to the end of the measuring capillary tube opposite the scavenging pipe on the one hand, and via the switch member to the suction pump on the other hand, whereas in the position of rest of the switchover device the said suction pipe is both separated from the measuring capillary tube and disconnected from the suction pump. This embodiment of the invention is particularly advantageous since it permits absolute functional separation of the cleaning and drying apparatus from the measuring system proper. Space saved owing to the absence of an intermediate line leading to the switchover device is now available for the convenient accommodation of calibration gas and other connections required for the measuring system.

According to a further embodiment of the invention, simplicity of design and dependability in operation are particularly increased by the use of a rotary slide valve as a switchover device, the switch member of the said rotary slide valve presenting an arched recess through which two control bores provided on the stationary member of the switchover device, one of which communicates with the suction pump and the other with the measuring capillary tube and/or the suction pipe, are interconnected both in the scavenging position and in the drying position of the switchover device. The scavenging pipe and the suction pipe, if any, can be designed in a simple manner as swiveling arms connected with the switch body, the said swiveling arms being completely swung clear of the measuring system if necessary, so as to facilitate operations.

Further details of the invention will appear from the following description of two embodiments of the invention with reference to the accompanying schematic drawing in which:

FIG. 1 is a longitudinal section of a measuring vessel equipped with a cleansing and drying device according to the invention, FIG. 2 is a sectional view of a preferred embodiment of the invention similar to FIG. 1.

In both embodiments of the invention the measuring vessel is designed as a hollow glass cylinder 1 closed at both ends by means of caps 2 and filled with a liquid maintained at body temperature by means of a thermostat. The hollow glass cylinder 1 contains a measuring capillary tube 3, both ends of which communicate with conical receiving bores 4 leading to the upper side of the cylinder 1. Between the two receiving bores 4 two additional receiving hoppers 5 for each of the measuring electrodes 26. The connecting pipes of the measuring electrodes 26 are designated by reference numeral 27.

In one receiving bore 4 of the instrument shown in FIG. 1 a switchcock 6 with control knob 7 is located, by means of which the measuring capillary tube 3 can be connected to a connecting pipe 8 branching off the left receiving bore 4 or else to a calibration gas or other pipe (not shown) associated with the measuring system, as required.

In spaced relation to the hollow glass cylinder 1 a switchover device 9 designed as a rotary slide valve is arranged, the rotatable or mobile switch member 10 of which presents a curved recess or control groove 11 cooperating with two control bores 12 and 13 provided on the stationary base 10 of the switchover device 9. One of the two control bores 12 communicates with the connecting pipe 8 leading to the measuring vessel. The other control bore 13 communicates with a suction pump 25 via a connecting pipe 14 and a waste water container 24 included in the suction pipe.

Attached to the switch member 10 is a scavenging pipe 15 in permanent communication with a scavenging duct 16 through which distilled water from a reservoir 23 can be drawn in. The scavenging pipe 15 which rests with the interposition of a pressure spring 17 on a rigid stop 18 and can be swung to the required position together with the switch member 10 of the switchover device 9 by means of a control knob 19, presents a downwardly bent end 20 with a circumferential joint 21 on top. This pipe end 20 can be inserted in the free receiving bore 4 of the measuring vessel by depressing the knob 19. The circumferential joint 21 then tightly adjoins the conical inner wall of the aperture 4, as indicated by dot-and-dash lines in FIG. 2. As a result of the action of the pressure spring 17 the scavenging pipe 15 and consequently, the switch member 10 occupies the position indicated by solid lines. When the switchover device 9 is in its position of rest, the scavenging pipe 15 is swung up (also indicated by dash-and-dot lines in the drawing).

For cleaning the measuring capillary tube 3, the switchcock 6 is first placed in the position shown, where the capillary tube 3 communicates with the connecting pipe 8. The scavenging pipe 15 is now moved downwards from its position of rest and placed in its bottommost end position (scavenging position) against the action of the pressure spring 17. In this position of the switch member 10 the two control bores 12 and 13 of the switchover device 9 communicate via the recess 11 of the switch member 10 and consequently, the lines 8 and 14 are also interconnected. As a result, the suction pipe draws the blood contained in the measuring capillary tube 3 off through the connecting pipe 8, the switchover device and the suction line 14. By means of the vacuum produced in the measuring capillary tube 3, distilled water is drawn from the reservoir 23 via the scavenging line 16 through the scavenging pipe 15 and passed through the capillary tube. As soon as the measuring capillary tube 3 has been cleared of any residual blood, the knob 19 of the switchover device is released and the spring 17 raises the connecting pipe 15 into the intermediate position (drying position) indicated by solid lines, thereby clearing the receiving bore 4. Since in this intermediate position communication between the suction pump and the capillary tube 3 is maintained, air is drawn into the capillary tube through the exposed receiving bore 4. Once the capillary tube has dried, the switchover device is again moved into its position of rest.

The instrument as shown in FIG. 2 differs from the embodiment of the invention illustrated in FIG. 1 only by the manner of connecting the suction pump to the measuring capillary tube 3. In fact, the connecting line 8 leading to the suction pump 25 has been replaced by a suction pipe 22 similar to the scavenging pipe 15, also carrying a circumferential joint 21 at its free end and tightly insertable into the suction-end receiving bore 4 of the measuring capillary tube 3. The suction pipe 22 communicates either directly or via the switchover device 9 with the suction pump.

For the cleansing of the measuring capillary tube 3, first the suction pipe 22 and, immediately after, the scavenging pipe 15 is introduced into the corresponding receiving bore. Via the suction pipe 22 blood is removed by suction from the capillary tube 3, as is the distilled water flowing in its wake through the scavenging pipe 15. The scavenging pipe 15 is then placed in the intermediate position illustrated in FIG. 3 and air is drawn through the capillary tube 3 via the free receiving bore 4.

I claim:

1. A measuring instrument for the microanalysis of blood gases comprising a measuring vessel having a measuring capillary tube capable of receiving a blood test sample mounted therein, said vessel having a plurality of receiving bores extending in transverse relation to said measuring capillary tube and terminating in said measuring capillary tube, a plurality of measuring electrodes, each of said electrodes located in one of said receiving bores respectively and in contact with said blood test sample in said measuring capillary tube, a device for cleansing and drying said measuring capillary tube comprising a reservoir containing a cleansing liquid, a suction pump, a switchover device consisting of a stationary base having two control bores and a manually moveable switch member mounted on the base and moveable from a final rest position via an intermediate position into a final scavenging position, a control groove on said switch member interconnecting said control bores in the intermediate and final scavenging positions of said switch member, a scavenging pipe attached to and moveable with said switch member, a scavenging line connecting one end of said scavenging pipe with said reservoir, the other end of said scavenging pipe being directly connected with one end of said measuring capillary tube in the said final scavenging position and separated from said measuring capillary tube in the remaining positions of said switch member, a suction pipe having two sections, the first section connecting the other end of said measuring capillary tube to one of said control bores, and the second section connecting the second control bore with said suction pump.

2. A measuring instrument according to claim 1 wherein said suction pipe is movable and is connected with said switch member of said switchover device, said first section of said suction pipe being connected to the said suction pump through both said control groove and said second section of said suction pipe in the final scavenging position and in the drying position of said switch member, said first section of said suction pipe being tightly connected with said measuring capillary tube opposite said scavenging pipe in the final scavenging position and the drying position but disconnected from said measuring capillary tube by reason of said control groove in the final rest position of said switchover device.

3. A measuring instrument according to claim 1, wherein the said switchover device is designed as a rotary slide valve having a stationary base comprising the aforesaid two control bores and a switch member rotatably mounted on said base, said switch member having a curved recess forming said control groove, said recess covering said two control bores and interconnecting the aforesaid two sections of said suction pipe in the final scavenging position and in the drying position of said switchover device.

4. A measuring instrument according to claim 2, wherein said switchover device is designed as a rotary slide valve having a stationary base with two control bores and a switch member rotatably mounted on said base, and having a curved recess forming said control groove, said recess covering the two control bores and connecting said suction pipe via said second section of said suction pipe with said suction pump in the final scavenging position and in the drying position of said switchover device.

* * * * *